United States Patent
Serino et al.

(10) Patent No.: US 10,828,694 B2
(45) Date of Patent: Nov. 10, 2020

(54) CASTING DEVICE, METHOD FOR DETECTING LEAKAGE OF REFRIGERANT IN CASTING DEVICE, AND LEAKAGE DETECTION DEVICE

(71) Applicants: Daisuke Serino, Nagakute (JP); Fumio Kawahara, Toyota (JP); Yuzo Matsuda, Toyota (JP); Tetsushi Yamaguchi, Toyota (JP); Hiroshi Kawahara, Nagakute (JP); Sakayuki Ishikawa, Okazaki (JP); Takuto Takahashi, Toyota (JP); Naoshi Sakaguchi, Kawasaki (JP); Hiroyuki Kayaba, Yokohama (JP); Takahiro Michimoto, Yokohama (JP)

(72) Inventors: Daisuke Serino, Nagakute (JP); Fumio Kawahara, Toyota (JP); Yuzo Matsuda, Toyota (JP); Tetsushi Yamaguchi, Toyota (JP); Hiroshi Kawahara, Nagakute (JP); Sakayuki Ishikawa, Okazaki (JP); Takuto Takahashi, Toyota (JP); Naoshi Sakaguchi, Kawasaki (JP); Hiroyuki Kayaba, Yokohama (JP); Takahiro Michimoto, Yokohama (JP)

(73) Assignees: TOYOTA JIDOSHA KABUSHIKI KAISHA, Toyota (JP); MEC INTERNATIONAL CO., LTD., Toyota (JP); MEIWA E-TEC CO., LTD., Toyota (JP); NIKON CORPORATION, Tokyo (JP)

( * ) Notice: Subject to any disclaimer, the term of this patent is extended or adjusted under 35 U.S.C. 154(b) by 221 days.

(21) Appl. No.: 15/776,191

(22) PCT Filed: Nov. 18, 2016

(86) PCT No.: PCT/JP2016/084295
§ 371 (c)(1),
(2) Date: May 15, 2018

(87) PCT Pub. No.: WO2017/090532
PCT Pub. Date: Jun. 1, 2017

(65) Prior Publication Data
US 2019/0176221 A1 Jun. 13, 2019

(30) Foreign Application Priority Data
Nov. 26, 2015 (JP) .................................. 2015-231081

(51) Int. Cl.
*B22C 9/06* (2006.01)
*B22C 23/02* (2006.01)
(Continued)

(52) U.S. Cl.
CPC ................ *B22C 9/065* (2013.01); *B22C 3/00* (2013.01); *B22C 23/02* (2013.01);
(Continued)

(58) Field of Classification Search
None
See application file for complete search history.

(56) References Cited

U.S. PATENT DOCUMENTS

| | | | |
|---|---|---|---|
| 2006/0134511 A1* | 6/2006 | Ito ........................ | H01M 6/5044 429/90 |
| 2007/0012173 A1* | 1/2007 | Kurita ................... | B22D 30/00 92/169.1 |
| 2013/0174648 A1 | 7/2013 | Ward | |

FOREIGN PATENT DOCUMENTS

| | | |
|---|---|---|
| CN | 1228365 A | 9/1999 |
| CN | 103192060 A | 7/2013 |
| | (Continued) | |

OTHER PUBLICATIONS

Apr. 28, 2019 Office Action issued in Chinese Patent Application No. 201680068177.2.
(Continued)

*Primary Examiner* — Paul M. West
*Assistant Examiner* — Mark A Shabman
(74) *Attorney, Agent, or Firm* — Oliff PLC

(57) ABSTRACT

A casting device in which refrigerant is pressure-fed to a cooling passage formed in a die, leakage of refrigerant in the die can be reliably detected in a short time without a
(Continued)

significant modification applied to the conventional device. A casting device includes a pressure-feed device that pressure-feeds refrigerant to a cooling passage formed in a die, and a release agent coating applicator that applies a release agent to the die, and further includes a unit that mixes a fluorescent agent into the refrigerant (fluorescent agent tank), a unit that irradiates the die surface of the die with black light while the refrigerant containing the fluorescent agent mixed therein is pressure-fed to the die, and an imaging device that captures an image of the die surface. The imaging device is integrally assembled with the release agent coating applicator.

9 Claims, 1 Drawing Sheet

(51) Int. Cl.
   *G01M 3/20* (2006.01)
   *B22C 3/00* (2006.01)
   *B22D 17/22* (2006.01)
   *B22D 11/22* (2006.01)
(52) U.S. Cl.
   CPC ........... *B22D 17/2218* (2013.01); *G01M 3/20* (2013.01); *B22D 11/22* (2013.01)

(56) References Cited

FOREIGN PATENT DOCUMENTS

| | | |
|---|---|---|
| CN | 105043685 A | 11/2015 |
| EP | 0941788 A2 | 9/1999 |
| JP | H03-199938 A | 8/1991 |
| JP | H11-170024 A | 6/1999 |
| JP | 2002-333310 A | 11/2002 |
| JP | 2007-222890 A | 9/2007 |
| JP | 2011-079017 A | 4/2011 |
| JP | 2011-185757 A | 9/2011 |
| JP | 2011-235330 A | 11/2011 |
| JP | 2013-212526 A | 10/2013 |
| JP | 5351081 B2 | 11/2013 |

OTHER PUBLICATIONS

Jun. 18, 2019 Office Action issued in Japanese Patent Application No. 2015-231081.
Jan. 17, 2020 Office Action issued in Chinese Patent Application No. 201680068177.2.

* cited by examiner

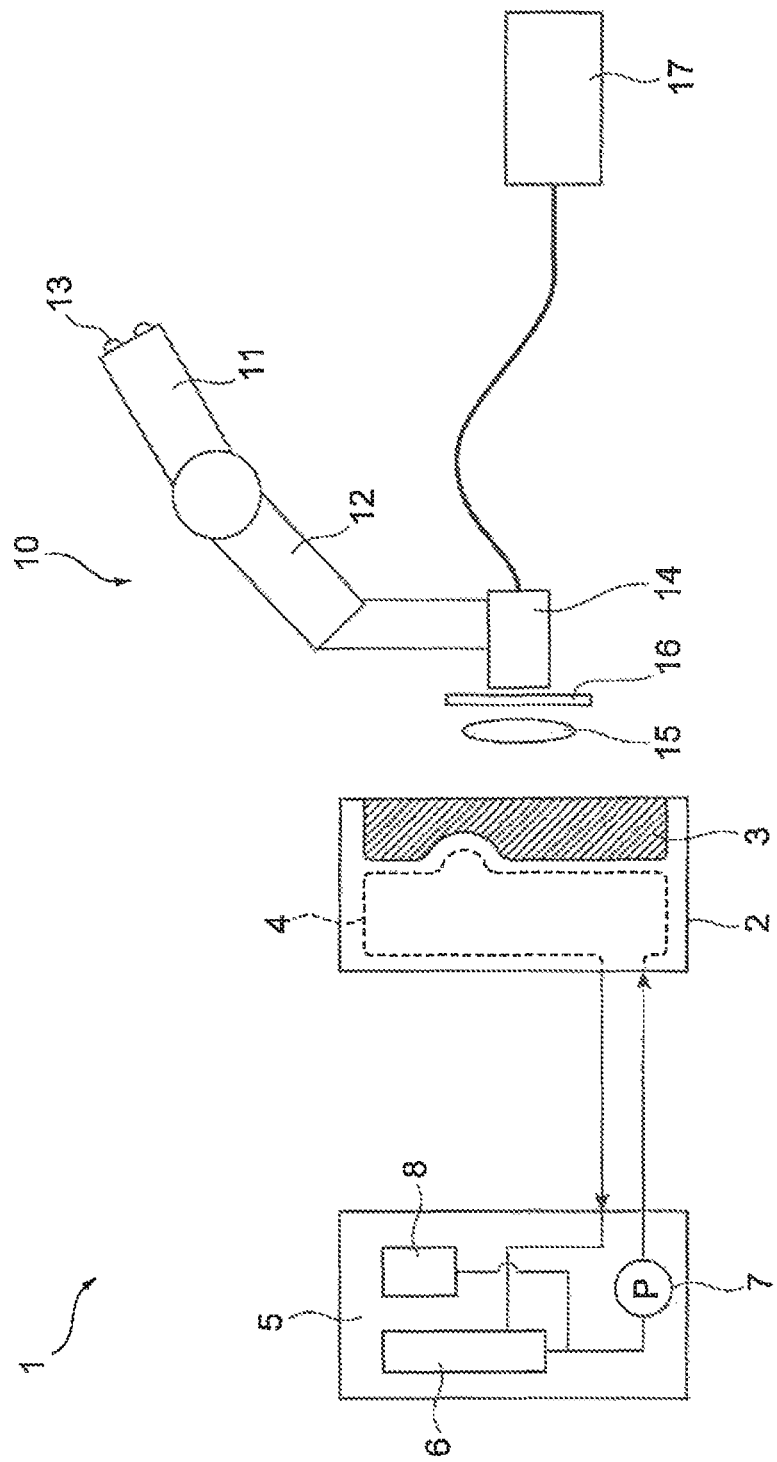

CASTING DEVICE, METHOD FOR DETECTING LEAKAGE OF REFRIGERANT IN CASTING DEVICE, AND LEAKAGE DETECTION DEVICE

TECHNICAL FIELD

The present invention relates to a casting device including a refrigerant pressure-feed device adapted to pressure-feed refrigerant to a cooling passage formed in a die, a method for detecting leakage of refrigerant in the casting device, and a leakage detection device.

BACKGROUND ART

In die casting, for example, refrigerant (e.g., cooling water) is fed to a refrigerant passage formed in a die so as to keep the die in the temperature range of non-defective products. If the refrigerant leaks out due to damage to the die and the like, defective casting occurs. Therefore, care should be taken so that the refrigerant will not leak. Leakage of refrigerant occurs mainly due to cracks generated in the die in many cases. Patent Literature 1 describes an invention related to introducing compressed air into a cooling passage formed in a metal die, and determining the size of a crack generated in the die, which can be a cause for leakage of refrigerant, on the basis of the pressure value of the air.

Meanwhile, Patent Literature 2 describes, as a method for detecting leakage of a liquid from a fuel tank, an engine, a liquid feed pipe, or the like for an automobile, circulating a liquid containing a fluorescent agent in advance, irradiating a portion where the presence or absence of leakage of the liquid should be detected with light that can excite a fluorescent material and measuring fluorescence so as to detect the presence or absence of leakage of the liquid. In addition, Patent Literature 3 describes, as a method for measuring the amount of oil applied to a strip coil, generating a differential image between an image obtained through ultraviolet irradiation and an image obtained without ultraviolet irradiation, and measuring the amount of the applied oil on the basis of the differential image. Further, Patent Literature 4 describes an invention related to a device for applying a release agent to a die surface of a die in performing high-speed die casting and the like.

CITATION LIST

Patent Literature

Patent Literature 1: JP 2011-235330 A
Patent Literature 2: JP H03-199938 A
Patent Literature 3: JP 2002-333310 A
Patent Literature 4: JP 2011-079017 A

SUMMARY OF INVENTION

Technical Problem

With the method that uses compressed air described in Patent Literature 1, a crack or cracks generated in the die, which can be a cause for leakage of refrigerant on the die surface, can be grasped quantitatively to a certain extent. However, since additional devices, such as a device for sending compressed air into the cooling passage in the die and a device for measuring the pressure of the air in the cooling passage, are needed, the cost is unavoidably increased. Further, since the method described in Patent Literature 1 is a method for estimating the size of a crack from the pressure value of air, leakage of refrigerant cannot be detected while it is actually passed through the cooling passage. Therefore, currently, it is common to stop the production at regular intervals and visually check if there is any leakage of water (leakage of refrigerant) from the die, which is problematic in that it takes a long time and leakage of a very small amount of water is difficult to detect.

The present invention has been made in view of the foregoing circumstances. It is an object of the present invention to disclose a casting device with a configuration in which refrigerant is pressure-fed to a cooling passage formed in a die, the casting device being capable of reliably detecting leakage of refrigerant in the die in a short time without a significant change made to the conventional device, a method for detecting leakage of refrigerant in the casting device, and a leakage detection device.

Solution to Problem

The inventors, through a number of trial-and-error approaches to solve the aforementioned problems, have found it possible to configure a casting device capable of reliably detecting leakage of refrigerant in a short time without making a significant modification to the conventional device and a method for detecting leakage of refrigerant in such a casting device, and thus arrived at the present invention.

That is, the casting device in accordance with the present invention is a casting device including at least a refrigerant pressure-feed device configured to pressure-feed refrigerant to a cooling passage formed in a die; and a release agent coating applicator configured to apply a release agent to at least a die surface of the die, and further including a unit configured to mix a fluorescent agent into the refrigerant; a unit configured to irradiate at least the die surface of the die with light that excites the fluorescent agent; and an imaging device configured to capture an image of at least the die surface of the die, in which the imaging device is integrally assembled with the release agent coating applicator.

According to a preferred aspect of the casting device in accordance with the present invention, the imaging device further includes an image processing unit configured to generate a differential image between two images, the two images including an image captured when at least the die surface of the die is irradiated with light that excites the fluorescent agent while the refrigerant containing the fluorescent agent mixed therein is pressure-fed to the die, and an image captured when at least the die surface of the die is not irradiated with light that excites the fluorescent agent.

A method for detecting leakage of refrigerant in a casting device in accordance with the present invention is a method for detecting leakage of refrigerant on a die surface of a die in a casting device, the device including at least a refrigerant pressure-feed device configured to pressure-feed refrigerant to a cooling passage formed in the die, and a release agent coating applicator configured to apply a release agent to at least the die surface of the die, the method including at least a step of mixing a fluorescent agent into the refrigerant; a step of pressure-feeding the refrigerant containing the fluorescent agent mixed therein to the cooling passage formed in the die; a step of irradiating at least the die surface of the die with light that excites the fluorescent agent while the refrigerant containing the fluorescent agent mixed therein is pressure-fed to the die, and capturing an image of the irradiated portion using an imaging device that is integrally assembled with the release agent coating applicator; and a step of determining the presence or absence of leakage of the refrigerant from the captured image.

A preferred aspect of the method for detecting leakage of refrigerant in the casting device in accordance with the present invention further includes a step of capturing an image of at least the die surface of the die when the die surface is not irradiated with light that excites the fluorescent agent while the refrigerant containing the fluorescent agent mixed therein is pressure-fed to the die, using the imaging device that is integrally assembled with the release agent coating applicator; and a step of generating a differential image between two images, the two images including the image captured when at least the die surface of the die was irradiated with light that excites the fluorescent agent, and the image captured when at least the die surface of the die was not irradiated with light that excites the fluorescent agent, thereby determining the presence or absence of leakage of the refrigerant from the differential image.

In addition, a leakage detection device in accordance with the present invention is a leakage detection device for detecting leakage of refrigerant containing a fluorescent agent mixed therein, the refrigerant being adapted to be pressure-fed into a die, the device including at least a unit configured to irradiate the die with light that excites the fluorescent agent; an imaging device configured to capture an image of the die; and a determination unit configured to extract an image of a portion that has emitted light in response to the fluorescent agent from an image of the die captured with the imaging device on the basis of color information on the image.

Advantageous Effects of Invention

According to the device and the method in accordance with the present invention, in order to detect leakage of refrigerant on at least a die surface of a die, refrigerant containing a fluorescent agent mixed therein is pressure-fed to a cooling passage in the die. While the pressure-feeding is continued, at least the die surface of the die is irradiated with light that excites the fluorescent agent, and then, an image of at least the die surface of the die is captured using an imaging device that is integrally assembled with the release agent coating applicator. If there is any leakage of the refrigerant on the die surface, the fluorescent agent is excited upon irradiation of the die surface with light that excites the fluorescent agent so that the fluorescent agent emits light with a specific wavelength. Then, an image of the fluorescent agent that emits the light is captured with the imaging device and the captured image is processed. Therefore, the actual leakage of refrigerant can be reliably grasped as an image in a short time even if the amount of the leakage is very small.

In addition, in the casting device, it is essential that the entire die surface of the die be coated with a release agent in order to obtain good products. To that end, the release agent coating applicator is usually configured to be able to apply a release agent to the entire die surface of the die. For example, the release agent coating applicator is attached to a robot arm, and the robot arm is appropriately operated so that the release agent coating applicator can apply a release agent to the entire die surface. In the device in accordance with the present invention, since the imaging device is integrally assembled with the release agent coating applicator with such a configuration, an image of the entire die surface can be captured easily and reliably, and thus, imaging can be reliably performed no matter which portion of the die surface has leakage of the refrigerant. Assembly of the imaging device on the existing release agent coating applicator can be easily performed without a significant modification applied to the existing casting device.

In a preferred aspect of the device and method in accordance with the present invention, images of the die surface of the die are captured when it is irradiated with light that excites the fluorescent agent and when it is not irradiated with such light, and then, a differential image between the two images is generated using a conventionally known technique. Generating such a differential image and detecting leakage of refrigerant on the basis of the image allows for more accurate detection of leakage.

BRIEF DESCRIPTION OF DRAWINGS

FIG. 1 is a schematic view of a main part for illustrating a casting device and a method for detecting leakage of refrigerant in the casting device in accordance with the present invention.

DESCRIPTION OF EMBODIMENTS

Hereinafter, an embodiment of the present invention will be described with reference to the drawing. In the drawing, reference numeral 1 denotes the main part of the casting device in accordance with the present invention, and the device 1 has a pair of dies 2 for casting. It should be noted that in FIG. 1, only one of the pair of dies is illustrated and the other die is not illustrated. In addition, illustration of a molten metal device that is necessary for casting is also omitted.

The die 2 is typically made of metal, and has a recessed die surface 3 in this example. In addition, the die 2 has formed therein a cooling passage 4 through which refrigerant, such as water, circulates. Reference numeral 5 denotes a refrigerant pressure-feed device including refrigerant cooling means 6 and a pressure-feed pump 7 therein. The refrigerant pressure-feed device 5 further includes a fluorescent agent tank 8 so that a fluorescent agent in the tank 8 can be fed in a required amount to the refrigerant by control means (not illustrated) when necessary.

The refrigerant is pressure-fed to the cooling passage 4 in the die 2 through the pressure-feed pump 7 so as to cool at least the die surface of the die 2 down to a required temperature. The refrigerant that has an increased temperature after the cooling is returned to the refrigerant cooling means 6 so that it is cooled down to a required temperature again.

A multi-axis robot 10 for applying a release agent, which has a conventionally known configuration, as an example of a release agent coating applicator is located at a position facing the die surface 3 of the die 2. In this example, the multi-axis robot 10 has at least two arms 11 and 12, and the arm 11 as one of the arms has attached thereto a release agent blowoff nozzle 13, and the other arm 12 has mounted thereon an imaging device 14 for capturing an image of the die surface 3 of the die 2.

The multi-axis robot 10 is operated by a control unit (not illustrated). Through the operation, the arm 11 as one of the arms is position-controlled so as to be able to blow a release agent off to the entire die surface from the release agent blowoff nozzle 13 attached thereto. Similarly, the other arm 12 is also position-controlled so as to be able to capture an image of the entire die surface. Though not illustrated, a multi-axis robot 10 that has one arm can also be used. In such a case, both the release agent blowoff nozzle 13 and the imaging device 14 are attached to the arm. The imaging device 14 may always be attached to the arm under the condition that the attachment does not obstruct the blowoff of a release agent from the release agent blowoff nozzle 13 or be attached thereto only when imaging is performed.

For the imaging device 14, black light 15, which is an example of light for exciting a fluorescent agent, is arranged on the front face side thereof at a position where the light can irradiate at least the die surface 3 of the die 2. In addition, an optical filter 16 for removing black light irradiation light (ultraviolet rays) is attached between the black light 15 and the imaging device 14. The optical filter 16 is used to prevent ultraviolet rays from the black light 15 from entering the lens of the imaging device 14. An image signal from the imaging device 14 is sent to a determination computer 17 so that required image processing is performed. It should be noted that not only the black light 15 but any other light sources can be used as long as such light source can excite a fluorescent agent contained in the refrigerant and thus allow the fluorescent agent to emit fluorescence light.

Next, a method for detecting leakage of refrigerant in the aforementioned casting device 1 will be described. Usually, casting is performed while refrigerant (cooling water) not containing a fluorescent agent mixed therein is pressure-fed to and circulated through the cooling passage 4 in the die 2. With the refrigerant, at least the die surface of the die can be held at a temperature that allows the resulting casting to keep its good quality. A fluorescent agent is mixed into the refrigerant periodically or when it is needed. Then, with the dies opened, the refrigerant containing the fluorescent agent mixed therein is pressure-fed to and is circulated through the cooling passages 4 in the dies 2.

While the refrigerant containing the fluorescent agent mixed therein is circulated, current is flowed through the black light 15 so that the black light is caused to irradiate at least the die surface of the die 2. If there is any leakage of the refrigerant on the die surface, the fluorescent agent contained in the leaked refrigerant is excited when irradiated with the black light 15, and thus the excited fluorescent agent emits light with a specific wavelength. When imaging is performed with the imaging device 14 attached to the multi-axis robot 10 in such a state, an image of visible light (which includes light generated upon excitation of the fluorescent agent) other than the black light irradiation light (ultraviolet rays) removed through the optical filter 16 is captured. Then, the color in the image is extracted using the determination computer 17 so that the determination computer 17 extracts from the captured image only an image of a portion where the fluorescent agent has been excited and thus emitted light (such an image is referred to as an "image 1"). Analyzing such image 1 can determine the presence or absence of leakage.

In order to determine the presence or absence of leakage more accurately, an image of the same portion is captured without black light irradiation. Then, a similar process is performed using the determination computer 17, that is, an image of only the same color as the emission color obtained through black light irradiation is obtained (such an image is referred to as an "image 2"). Then, a differential image between the image 1 and the image 2 is created with the determination computer 17 using a conventionally known method such as the one described in Patent Literature 3 above, whereby the same color as the emission color contained in the visible light can be removed, and thus, an image obtained by extracting light with only a specific wavelength, which has been emitted upon reaction of the fluorescent agent in the leaked refrigerant to black light, can be obtained. The size of the obtained image (the number of pixels greater than or equal to a specific number) is compared with a database obtained from past experience and the like so that the presence or absence of leakage of the refrigerant can be grasped more accurately.

With the adoption of the aforementioned technique, it has become possible to detect the presence or absence of leakage of refrigerant in about 2 minutes through the experiment of the inventors, though it has conventionally taken about 10 minutes to detect leakage of refrigerant with the human eyes. Further, it has also become possible to reliably detect even a very small amount of leakage that may not be found through inspection with the human eyes, and thus the accuracy of inspection has significantly improved. Further, since a set of the imaging device 14, the black light 15, and the optical filter 16 is integrally assembled with the release agent coating applicator 10 that has been conventionally used for casting devices, it has become possible to easily and reliably obtain an image of any given portion of the die surface 3 of the die 2 without making a significant modification to the casting device 1. Thus, effective detection of leakage has become possible also in terms of cost through the utilization of the existing facilities.

REFERENCE SIGNS LIST

1 Main part of casting device in accordance with the present invention
2 Die
3 Die surface
4 Cooling passage
5 Cooling water (refrigerant) pressure-feed device
6 Refrigerant cooling means
7 Pressure-feed pump
8 Fluorescent agent tank
10 Multi-axis robot for applying release agent
11, 12 Robot arms
13 Release agent blowoff nozzle
14 Imaging device
15 Black light (light that excites fluorescent agent)
16 Optical filter
17 Determination computer

The invention claimed is:

1. A casting device comprising at least:
   a refrigerant pressure-feed device configured to pressure-feed refrigerant to a cooling passage formed in a die; and
   a release agent coating applicator configured to apply a release agent to at least a die surface of the die,
   wherein:
   the casting device further comprises:
     a unit configured to mix a fluorescent agent into the refrigerant,
     a unit configured to irradiate at least the die surface of the die with light that excites the fluorescent agent, and
     an imaging device configured to capture an image of at least the die surface of the die, and
   the imaging device is integrally assembled with the release agent coating applicator.

2. The casting device according to claim 1, wherein the imaging device further includes an image processing unit configured to generate a differential image between two images, the two images including an image captured when at least the die surface of the die is irradiated with light that excites the fluorescent agent while the refrigerant containing the fluorescent agent mixed therein is pressure-fed to the die, and an image captured when at least the die surface of the die is not irradiated with light that excites the fluorescent agent.

3. The casting device according to claim 1, further comprising a control unit, wherein
the release agent coating applicator includes a first arm and a second arm, the first arm being provided with a release agent blowoff nozzle for applying the release agent, the second arm being provided with the imaging device, and
the control unit is adapted to control the first arm to apply the release agent to at least the die surface of the die.

4. A method for detecting leakage of refrigerant on a die surface of a die in a casting device, the device including at least a refrigerant pressure-feed device configured to pressure-feed refrigerant to a cooling passage formed in the die, and a release agent coating applicator configured to apply a release agent to at least the die surface of the die, the method comprising at least:
a step of mixing a fluorescent agent into the refrigerant;
a step of pressure-feeding the refrigerant containing the fluorescent agent mixed therein to the cooling passage formed in the die;
a step of irradiating at least the die surface of the die with light that excites the fluorescent agent while the refrigerant containing the fluorescent agent mixed therein is pressure-fed to the die, and capturing an image of the irradiated portion using an imaging device that is integrally assembled with the release agent coating applicator; and
a step of determining the presence or absence of leakage of the refrigerant from the captured image.

5. The method for detecting leakage of refrigerant in the casting device according to claim 4, further comprising:
a step of capturing an image of at least the die surface of the die when the die surface is not irradiated with light that excites the fluorescent agent while the refrigerant containing the fluorescent agent mixed therein is pressure-fed to the die, using the imaging device that is integrally assembled with the release agent coating applicator; and
a step of generating a differential image between two images, the two images including the image captured when at least the die surface of the die was irradiated with light that excites the fluorescent agent, and the image captured when at least the die surface of the die was not irradiated with light that excites the fluorescent agent, thereby determining the presence or absence of leakage of the refrigerant from the differential image.

6. The method for detecting leakage of refrigerant in the casting device according to claim 4, wherein
the casting device further comprises a control unit,
the release agent coating applicator includes a first arm and a second arm, the first arm being provided with a release agent blowoff nozzle for applying the release agent, the second arm being provided with the imaging device, and
the control unit is adapted to control the first arm to apply the release agent to at least the die surface of the die.

7. A leakage detection device for detecting leakage of refrigerant containing a fluorescent agent mixed therein, the refrigerant being adapted to be pressure-fed into a die, the device comprising at least:
a unit configured to irradiate at least a die surface of the die with light that excites the fluorescent agent;
an imaging device configured to capture an image of at least the die surface of the die; and
a determination unit configured to extract an image of a portion that has emitted light in response to the fluorescent agent from an image of the die captured with the imaging device on the basis of color information on the image, wherein
the imaging device is integrally assembled with a release agent coating applicator configured to apply a release agent to at least the die surface of the die.

8. The leakage detection device according to claim 7, wherein
the imaging device further includes an image processing unit configured to generate a differential image between two images, the two images including an image captured when at least the die surface of the die is irradiated with light that excites the fluorescent agent while the refrigerant containing the fluorescent agent mixed therein is pressure-fed to the die, and an image captured when at least the die surface of the die is not irradiated with light that excites the fluorescent agent.

9. The leakage detection device according to claim 7, wherein
the release agent coating applicator includes a first arm and a second arm, the first arm being provided with a release agent blowoff nozzle for applying the release agent, the second arm being provided with the imaging device.

* * * * *